Figure 1:
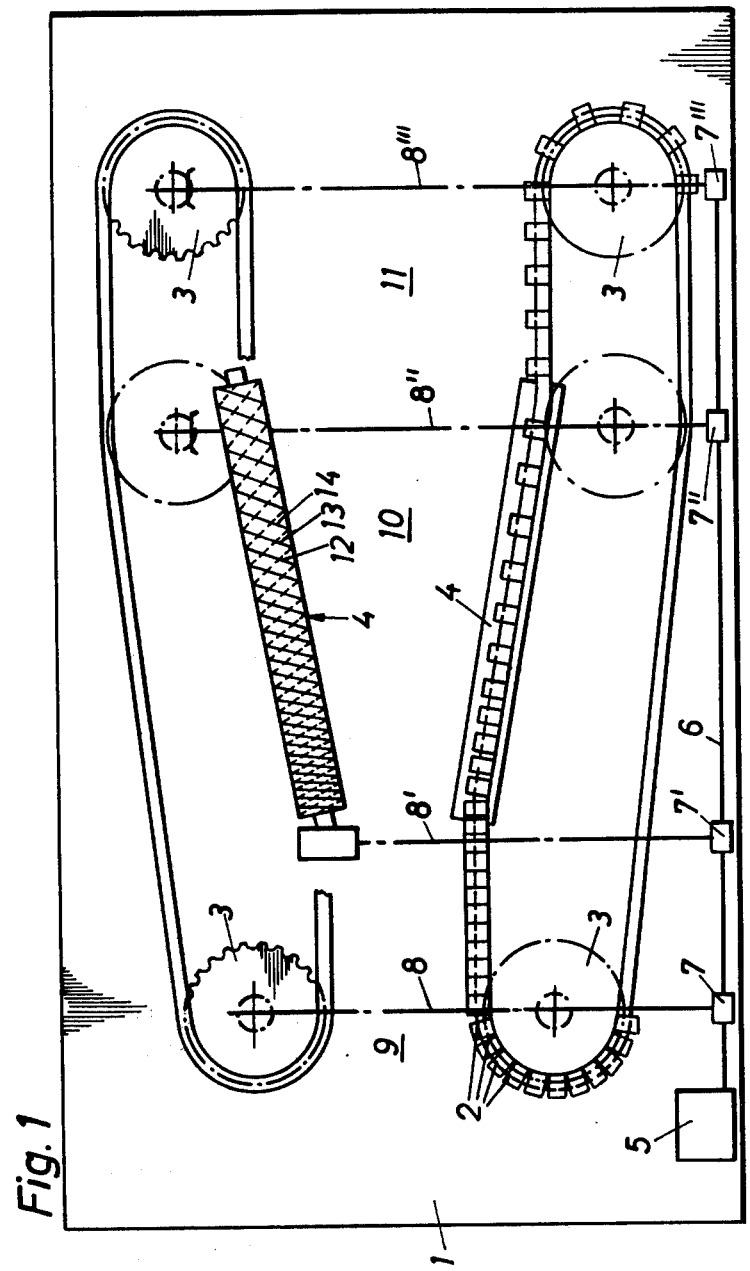

United States Patent [19]
Kamfe et al.

[11] 4,200,963
[45] May 6, 1980

[54] MACHINE FOR SIMULTANEOUS BIAXIALLY STRETCHING

[75] Inventors: Eberhard Kamfe, Wiehl; Willi Schmidt, Nümbrecht-Elsenroth, both of Fed. Rep. of Germany

[73] Assignee: Firma Erwin Kampf GmbH & Co. Machinenfabrik, Mühlen, Fed. Rep. of Germany

[21] Appl. No.: 957,035

[22] Filed: Nov. 2, 1978

[30] Foreign Application Priority Data

Nov. 3, 1977 [DE] Fed. Rep. of Germany ....... 2749185

[51] Int. Cl.² ........................ B29D 7/24; D06C 3/00
[52] U.S. Cl. .................................. 26/73; 264/290.2
[58] Field of Search ................ 26/73, 52, 72, 89, 93, 26/95; 198/472, 473, 625; 264/289, 290.2

[56] References Cited

U.S. PATENT DOCUMENTS

| | | | |
|---|---|---|---|
| 3,014,234 | 12/1961 | Koppehele | 264/289 |
| 3,305,889 | 2/1967 | Lewis et al. | 26/73 |
| 3,445,887 | 5/1969 | Tsien | 26/73 |
| 3,755,862 | 9/1973 | Molz | 26/73 |

*Primary Examiner*—James B. Lowe
*Attorney, Agent, or Firm*—Bacon & Thomas

[57] ABSTRACT

A biaxial web stretching machine has diverging tong conveying screws and the screws are provided with double or triple threads to provide relatively high speed tong movement with a relatively low speed of screw rotation.

3 Claims, 2 Drawing Figures

MACHINE FOR SIMULTANEOUS BIAXIALLY STRETCHING

DESCRIPTION

The invention relates to a simultaneous biaxially stretching machine for thermoplastic films having tong guide ways arranged on both sides of a running-in zone, a stretching zone, a fixing zone and conveying means for the tongs.

In the case of a prior art simultaneous biaxially stretching machine, the tongs within the stretching zone are guided by a spindle with expanding pitch so that a simultaneous longitudinal and transverse stretching of the thermoplastic film within the stretching zone is performed. The high run-out speeds of such a plant necessitate a high speed of the spindles. Thereby mechanical problems are caused and, in addition, a high noise development at the high-speed spindles. That is primarily true for a comparatively small longitudinal stretching ratio.

The principal object of the invention is such a provision of the spindles that the said difficulties are removed.

As a solution the invention proposes that the spindles be multiple-threaded.

It turned out that by a multiple-threaded configuration of the spindles a low-noise and low-wear guidance of the tongs is secured. The screw guiding ways place at disposal a sufficient force component for the forward motion of the tongs. The speed of the spindles, related to the same feed velocity of the tongs, can be decreased in the ratio of the number of the threads. Even in the case of a small longitudinal stretching ratio, a high run-out velocity of the tongs and, thus, of the stretched film can be secured. Due to the fact that, in the application of a multiple-threaded spindle, the lead of the individual screw ways is increased, it is possible to secure a high conveying velocity of the tongs, in spite of a comparatively small spindle speed.

According to a preferred embodiment, the invention provides that the spindles are designed as double-threaded spindles or as triple-threaded spindles. Thus, the speed of the spindles can be reduced to the half or a third, respectively, of the relative value. The tongs velocity remains the same in regard to the reference value.

In the simultaneous biaxially stretching machine according to the invention, successive tongs are engaged and conveyed in each case by different threads. The manufacturing expenditure for the transporting spindles is not increased considerably. Nevertheless the following advantages result. By virtue of the reduced spindle speed the demands on the mechanical drive of the spindle are lower. Formation of noise of the drive as well as formation of noise with the catching of the tongs is reduced. The reduced speed guarantees a secure and more uniform catching of the tongs.

Figure 2:
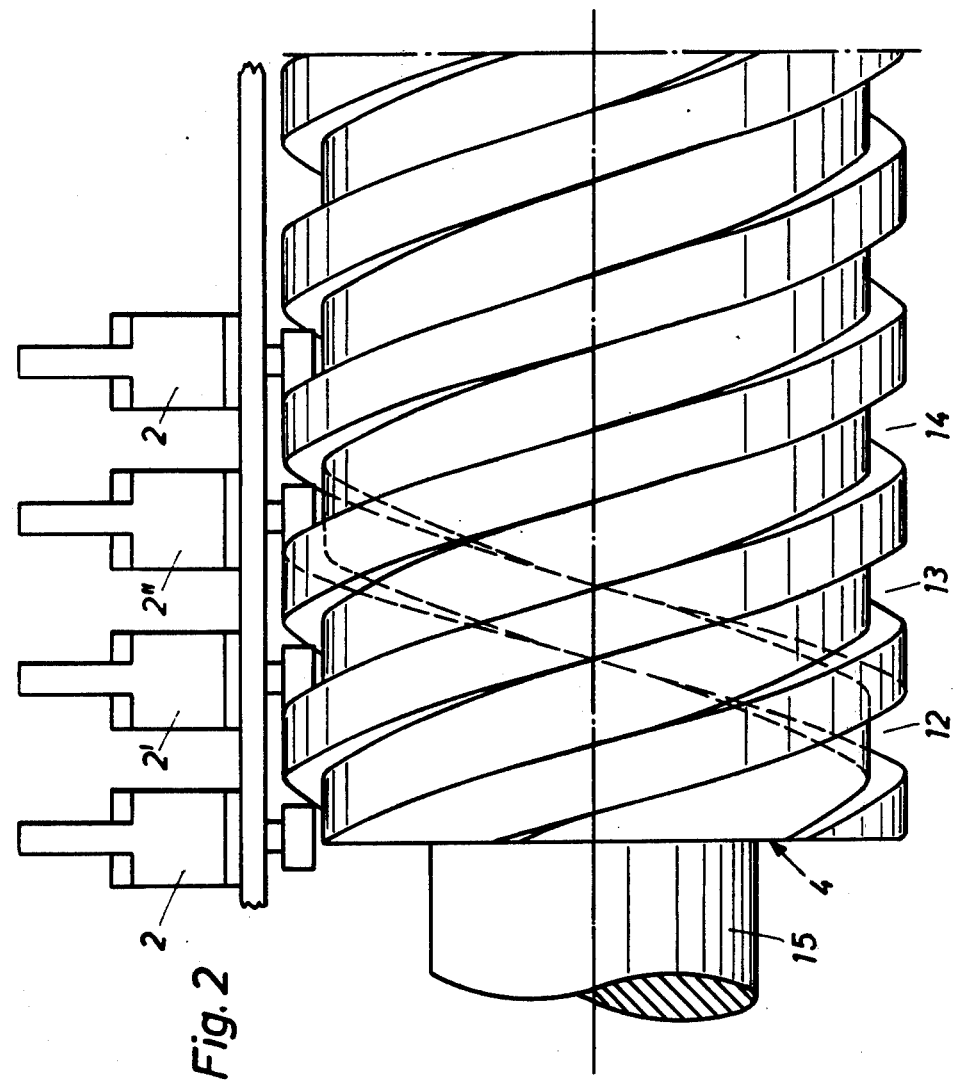

One embodiment of the invention will be described in the following with reference to the attached drawings, wherein FIG. 1 shows a schematic general view of a simultaneous biaxially stretching machine, whilst FIG. 2 is a partial view of a spindle.

The simultaneous biaxially stretching machine according to FIG. 1 is mounted on a base frame 1. Tongs guide ways for tongs 2 are arranged on both sides. The tongs guide ways comprise guide wheels 3, spindles 4 and, possibly, other transporting means such as conveying belts, chain drives, and the like. On the drawing these conveying means as well as the tongs are shown merely schematically and also partially for the sake of clarity and clearness of the drawing.

The driving motor 5 drives a main shaft 6. Via branching drives 7, 7', 7'', 7''' and additional drive shafts 8, 8', 8'', 8''' as well as via drives and/or bevel gear drives, respectively, the different guide wheels 3, the spindles 4, and the further conveying means are driven. Details of this drive are not shown.

In the running-in zone an unstretched film is engaged and held by the tongs 2 at both longitudinal edges. In the stretching zone 10 the tongs are guided apart in the width direction; simultaneously, the distance of the tongs in the longitudinal direction is increased. Adjacent to the stretching zone 10, there is provided a fixing zone 11. For the film, there is provided a winding-off and a winding-up, not shown. The devices for the temperature control are not shown.

The invention proposes to form the spindles 4 with three screw guide ways 12, 13, 14. FIG. 2 shows a partial view of a spindle 4 which is supported by a shaft 15. The three screw guide ways 12, 13, 14 are offset relatively to one another in each case by 120° in the circumferential direction. The tongs are engaged in each case by successive screw guide ways. According to the illustration of FIG. 2 a group of tongs 2 is engaged by the screw guide way 13, another group of tongs 2' by the screw guide way 14, and finally a group of tongs 2'' by the screw guide way 12. With the same running velocity of the tongs 2 and the same diameter of the spindle 4, it is possible in the case of the configuration described to reduce the speed of the spindles to one third. This means a considerable reduction of the mechanical loads and, in addition, a decrease of the noise formation. The tongs are uniformly moved through the stretching zone.

The simultaneous biaxially stretching machine according to the invention is adapted for the processing of thermoplastic films of any material, e. g. polyamide, polyester, polystyrene, polyethylene, polypropylene, and the like.

We claim:

1. Simultaneous biaxally stretching machine for thermoplastic films, having tongs guide ways arranged on both sides of a running-in zone, a stretching zone, a fixing zone, and conveying means for the tongs, there being provided, at least, in individual straight sections of the tongs guide ways, spindles having screw guide ways, partly with changing lead, for the tongs, characterized in that the spindles (4) are provided as multiple-threaded spindles.

2. Simultaneous biaxially stretching machine according to claim 1, characterized in that the spindles (4) are provided with double threads.

3. Simultaneous biaxially stretching machine according to claim 1, characterized in that the spindles (4) are provided with triple threads.

* * * * *